United States Patent
Schneeberger

(10) Patent No.: US 6,181,701 B1
(45) Date of Patent: Jan. 30, 2001

(54) METHOD FOR OPTIMIZING THE TRANSMISSION OF ATM CELLS VIA CONNECTION SECTIONS

(75) Inventor: Stefan Schneeberger, Vaterstetten (DE)

(73) Assignee: Siemens Aktiengesellschaft (DE)

( * ) Notice: Under 35 U.S.C. 154(b), the term of this patent shall be extended for 0 days.

(21) Appl. No.: 08/994,717

(22) Filed: Dec. 19, 1997

(30) Foreign Application Priority Data

Dec. 19, 1996 (DE) ................................. 196 53 118

(51) Int. Cl.[7] ........................................ H04L 12/28
(52) U.S. Cl. ............................... 370/395; 370/412
(58) Field of Search .................................. 370/235, 392, 370/395, 396, 397, 412, 413

(56) References Cited

U.S. PATENT DOCUMENTS

| | | | |
|---|---|---|---|
| 5,491,691 | * 2/1996 | Shtayer et al. | 370/61 |
| 5,748,614 | * 5/1998 | Wallmeier | 370/235 |
| 5,850,395 | * 12/1998 | Hauser et al. | 370/398 |
| 5,859,835 | * 1/1999 | Varma et al. | 370/229 |

FOREIGN PATENT DOCUMENTS

| | | |
|---|---|---|
| 0 498 092 A1 | 2/1991 | (EP) . |
| 0 748 086 A1 | 6/1995 | (EP) . |

* cited by examiner

*Primary Examiner*—Huy D. Vu
*Assistant Examiner*—Alexander O. Boakye
(74) *Attorney, Agent, or Firm*—Bell, Boyd & Lloyd LLC

(57) ABSTRACT

A method for optimizing the transmission of ATM cells via connection sections wherein, in order to decide which ATM cells stored in waiting ques are to be multiplexed onto further connection sections and at which point in time, connection information together with a respectively allocated time mark is stored in a sorted list according to the criterion of a predetermined ordering rule. Such rule is fashioned such that the time value assigned to the connection information is stored in a predetermined sequence in the sorted list and a check is carried out when new connection information is stored to see whether the time value allocated thereto can be entered into the sorted list.

6 Claims, 1 Drawing Sheet

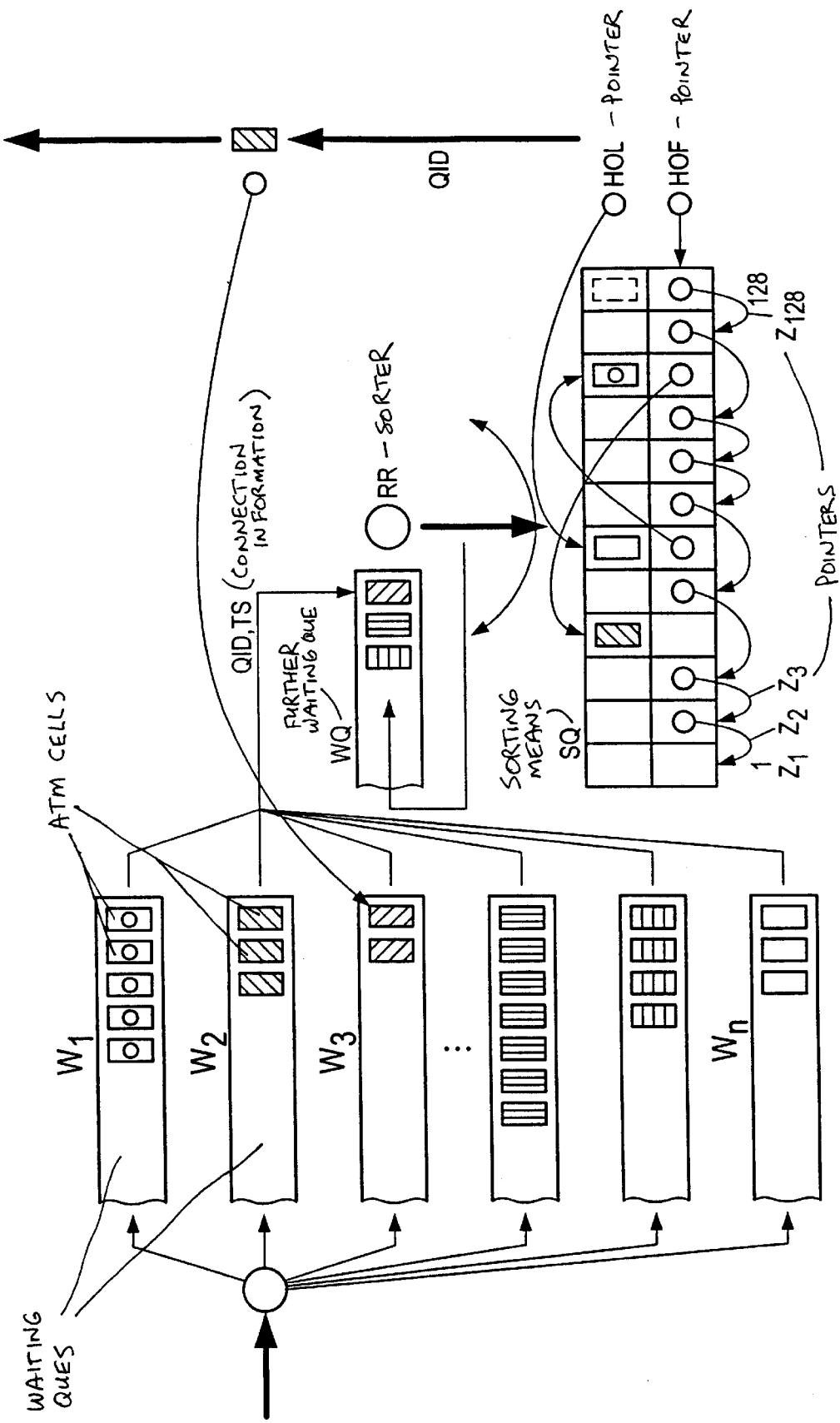

METHOD FOR OPTIMIZING THE TRANSMISSION OF ATM CELLS VIA CONNECTION SECTIONS

BACKGROUND OF THE INVENTION

1. Field of the Invention

The present invention is directed to a method for optimizing the transmission of ATM cells via connection sections wherein, in order to decide which ATM cells stored in waiting ques are to be multiplexed onto further connection sections at a particular point in time, an accompanying piece of connection information and a respectively allocated time mark is stored in a sorted list according to a predetermined ordering rule.

2. Description of the Prior Art

In contemporary packet switching systems, information is typically transmitted in data packets. Using ATM cells as an example, such cells comprise both a header part and an information part. Connection-relevant information is stored in the header part and the useful data to be transmitted is stored in the information part. The actual transmission usually occurs via connection sections between a transmitter and a receiver. The potential therefore exists that a plurality of transmission equipment might transmit their respective cell streams via the same connection section.

In order to be able to implement the transmission of the respective cell streams corresponding to their individual requirements, the prior art has proposed a calendar mechanism. The corresponding relationships are set forth in greater detail in European Letters Patent EP 0 498 092. The call-individually determined transmission bit rate is, thereby, strictly limited by entries in the calendar. However, there exists the problem that calendar increase must be implemented for every time slot. Further, a certain imprecision in the time thus arises, since a plurality of ATM cells is respectively allocated to a time slot of the calendar in this case and might have an unbeneficial influence in dynamic terms.

SUMMARY OF THE INVENTION

The present invention is based on the object of transmitting ATM cells via connection sections in an optimal fashion. The present invention is particularly advantageous in that call information, together with a time mark, is stored in a sorted list based on the criterion of a predetermined ordering rule. The dynamics of the overall system is thus enhanced and the outlay for hardware is greatly reduced.

In an embodiment of the present invention, a method is provided which comprises the steps of: providing a plurality of waiting ques; storing ATM cells carrying connection information in the plurality of waiting ques; forming a scheduler from a further waiting que, a sorter and a sorter storage area; establishing a removal criterion for the connection information in the scheduler; removing the connection information from the ATM cells stored in one of the plurality of waiting ques based on the removal criterion; providing the removed connection information with a time mark; supplying the removed connection information to an upper end of the further waiting que; establishing a predetermined plurality of comparison operations; establishing a predetermined ordering rule; and using the sorter to insert the removed connection information into the sorter storage area.

In an embodiment, the method also includes the step of defining the time mark as the latest point in time at which a single ATM cell is to be supplied to a further connection section.

In an embodiment, the method also includes the step of defining the removal criterion such that, when an ATM cell is supplied to an empty waiting que, the associated connection information and the time mark are transmitted to an upper end of the further waiting que.

In an embodiment, the method also includes the step of defining the removal criterion such that the connection information is only supplied to the further waiting que when an identical connection information leaves the scheduler.

In an embodiment, the method also includes the step of implementing the predetermined plurality of comparison operations within a defined time interval.

In an embodiment, the method also includes the step of organizing the sorter storage area as a chained list, wherein a first pointer defines the upper end and a second pointer defines free memory elements.

In an embodiment, the method also includes the step of defining the predetermined ordering rule such that the time mark assigned to the connection information is organized in a predetermined sequence.

Additional features and advantages of the present invention are described in, and will be apparent from, the detailed description of the preferred embodiments and from the drawing.

BRIEF DESCRIPTION OF THE DRAWING

FIG. 1 shows a schematic diagram of a method for optimizing the transmission of ATM cells via connection sections in accordance with the principles of the present invention.

DETAILED DESCRIPTION OF THE PREFERRED EMBODIMENTS

The present invention may be explained in greater detail with reference to the exemplary embodiment shown in FIG. 1. FIG. 1 shows the devices on which the inventive method may be executed. Waiting ques $W_1 \ldots W_n$ are disclosed that are formed as first in, first out (FIFO) memories. ATM cells are call-individually stored therein. Accordingly, ATM cells that belong to a connection having the number 1 are stored in the wafting que $W_1$. ATM cells that belong to a connection having the number 2 are stored in the waiting que $W_2$, etc.

The ATM cells also carry connection information QID. This is respectively determined upon the setup of a connection. The ATM cells whose connection information QID is stored in a following scheduling means are now stored in the waiting ques $W_1 \ldots W_n$.

The following scheduling means is formed by a further waiting que WQ, by a sorter RR, and by a sorter means SQ. The connection information QID, together with an allocated time mark TS, are contained in the waiting que WQ as well as in the sorting means SQ. According to the preferred method of the present invention, the connection information QID is taken from an ATM cell pending the waiting ques $W_1 \ldots W_n$ and is stored at the upper end of the waiting que WQ. Isochronically therewith, the time mark TS is allocated to the connection information QID that has been removed. This time mark TS relates to the latest point-in-time at which the relevant, allocated ATM cell is to be multiplexed onto the connection section and supplied to further devices. The removal of a connection information QID from an ATM cell pending in one of the waiting ques $W_1 \ldots W_n$ occurs based on the criterion of two removal criteria which are specified in greater detail below.

The sorting means SQ is organized as a chained list and comprises a total of 128 memory elements according to the presently preferred embodiment. Three parameters are thus deposited per memory element; namely, the connection information QID, the respectively allocated time mark TS and a pointer $Z_x$ which indicates a different memory element and which links the elements of the chained list with one another. Finally, a pointer HOL is defined that always points to the memory element in which the connection information QID, having the lowest time value TS, is contained. A pointer HOF is also defined that respectively points to an empty memory element.

In order to decide which ATM cells stored in the waiting ques $W_1 \ldots W_n$ are to be multiplexed onto further connection sections and at which point-in-time, a connection information QID, together with the respectively allocated time mark TS, are subjected to the inventive method described below.

ATM cells are first supplied to the waiting ques $W_1 \ldots W_n$ via connection sections. A waiting que can thereby exhibit either an empty or a partially-filled condition. When one of the wafting ques exhibits an empty condition and when a first ATM cell is supplied to this waiting que, the connection information QID contained therein is immediately forwarded to the waiting que WQ and entered at its uppermost location. The first removal criterion is thus defined, whereby the connection information QID is taken from the ATM cells pending in one of the waiting ques and is supplied to the waiting que WQ when its respective ATM cell is supplied to an empty waiting que.

The highest processing priority by the sorter RR is defined by the entry of the ATM cell at the uppermost location of the wafting que WQ. This sorter RR subsequently checks whether this connecting information QID can be supplied to the sorting means SQ. To this end, a plurality of comparison operations are implemented. According to the preferred embodiment, a total of eight of these comparison operations are to be driven. Further, a specific time interval $\Delta t$ is used for the implementation of these comparison operations. When the relevant connection information QID cannot be sorted within this time interval, it is taken from the uppermost location of the waiting que WQ and supplied to the end of the waiting que WQ.

The criterion which controls the sorter RR in the sorting means SQ is based on the size of the time value TS that is allocated to the connection information QID. To this end, the uppermost entry in the sorting means SQ has to be checked first by the sorter RR. This is made possible as the sorter means SQ is organized as a chained list that is already sorted. The pointer HOL thereby points to the memory element in which the connection information QID having the lowest time value TS is deposited. When the new connection information QID exhibits an even lower time value TS, this is written into a free memory element identified by the pointer HOF. When the new entry to be inserted is higher according to the ordering rule, a branch is immediately, made to the next entry, wherein the same comparison is implemented. Pursuant to the method of the present invention, a total of eight of these comparisons are implemented. When the new connection information QID cannot be sorted into the sorted list of the sorting means SQ within these eight comparison operations, it is written back to the end of the waiting que WQ for a later handling event.

The defined quantity $\Delta t$ is prescribed as a maximum time interval. Should this time span expire without a sorting event occurring, the appertaining connection information QID, together with the allocated time value TS, is stored at the end of the waiting que WQ. As a result of the comparison operations, however, the parameters of the last comparison are stored so that when this connection information QID again resides at the uppermost location of the waiting que WQ, one can continue without having to repeat the comparison operations that were already implemented.

When an entry into the sorting means SQ occurs in one of the eight comparison operations within the time interval $\Delta t$, the appertaining connection information QID is then entered into an empty memory element specified by the point HOF. Since the sorter means SQ is organized as a chained list, the pointers HOL, HOF and $Z_1 \ldots Z_{128}$ indicating the connection information must be re-organized.

Subsequently, the connection information QID having the lowest time value is taken from the sorting means SQ. This is stored in the memory element to which the pointer HOL points. Based on the criterion of the connection information QID, the ATM cell that is allocated thereto is identified and multiplexed to further connection sections. Since a connection information QID was taken from the sorting means SQ, this now might not comprise any connection information QID of this connection type. For this reason, a connection information QID of this connection type is reloaded from one of the waiting ques $W_1 \ldots W_n$. As a result, the second removal criterion is defined.

Let us consider the example of a voice connection. Such a connection always has the highest priority and is expressed in the calculation of very low time values TS. When an ATM cell belonging to a voice connection is supplied to an empty waiting que $W_x$, the associated connection information QID and the allocated time mark TS are entered directly at the upper end of the waiting que WQ. Since these are now located at the memory location having the highest priority, they are immediately read out and checked to see if they can be classified in the sorting means SQ. This is made possible since the connection information QID is taken from the counters immediately after reorganization and after the allocated ATM cell is multiplexed. A plurality of voice connections could also be supplied to the sorter RR via the same waiting que $W_x$.

According to the presently preferred embodiment, the sorting means SQ comprises 128 memory elements. This, however, should not denote a limitation of the present invention, nor should the application of eight comparison operations.

Due to the realization of the scheduling means composed of waiting ques WQ and sorting means SQ, it is not necessary to provide the same number of memory elements for the latter as there are connections to be administered. Overflowing entries in the sorting means SQ can be collected in the waiting que WQ, thus representing a substantial saving in terms of hardware requirements.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the hereinafter appended claims.

I claim as my invention:

1. A method for optimizing the transmission of ATM cells via connection sections, comprising the steps of:
   providing a plurality of waiting queues;
   storing ATM cells carrying connection information in the plurality of waiting queues, wherein each of the ATM cells is respectively stored in one of the waiting queues based on its respective connection information;

forming a scheduler from a further waiting queue, a sorter and a sorter storage area;

establishing a removal criterion for the connection information in the scheduler;

removing the connection information from the ATM cells stored in one of the plurality of waiting queues based on the removal criterion;

providing the removed connection information with a set, respective time mark, wherein the time mark is the latest point-in-time at which a single ATM cell is to be supplied to a further connection section;

supplying the removed connection information to an upper end of the further waiting queue;

establishing a predetermined plurality of comparison operations;

establishing a predetermined ordering rule; and using the sorter to insert the removed connection information into the sorter storage area based on both the predetermined plurality of comparison operations and the predetermined ordering rule.

2. A method as claimed in 1, further comprising the step of:

defining the removal criterion such that, when an ATM cell is supplied to an empty waiting queue, the associated connection information and the time mark are transmitted to an upper end of the further waiting queue.

3. A method as claimed in claim 1, further comprising the step of:

defining the removal criterion such that the connection information is only supplied to the further waiting queue when identical connection information leaves the scheduler.

4. A method as claimed in claim 1, further comprising the step of:

implementing the predetermined plurality of comparison operations within a defined time interval.

5. A method as claimed in claim 1, further comprising the step of:

organizing the sorter storage area as a chained list, wherein a first pointer defines the upper end and a second pointer defines free memory elements.

6. A method as claimed in claim 1, further comprising the step of:

defining the predetermined ordering rule such that the time mark assigned to the connection information is organized in a predetermined sequence.

* * * * *